United States Patent [19]

Somers

[11] Patent Number: 4,617,600

[45] Date of Patent: Oct. 14, 1986

[54] MAGNETIC HEAD HAVING A THIN STRIP OF MAGNETORESISTIVE MATERIAL AS A READING ELEMENT

[75] Inventor: Gerardus H. J. Somers, Eindhoven, Netherlands

[73] Assignee: U.S. Philips Corporation, New York, N.Y.

[21] Appl. No.: 593,073

[22] Filed: Mar. 26, 1984

[30] Foreign Application Priority Data

Apr. 5, 1983 [NL] Netherlands .................. 8301188

[51] Int. Cl.[4] .............................................. G11B 5/30
[52] U.S. Cl. .................................... 360/113; 324/252; 338/32 R
[58] Field of Search ................ 360/113, 127, 125–126, 360/122, 121; 324/252; 338/32 R

[56] References Cited

U.S. PATENT DOCUMENTS

| | | | |
|---|---|---|---|
| 3,921,217 | 11/1975 | Thompson | 360/113 |
| 4,100,583 | 7/1978 | Koel et al. | 360/113 |
| 4,150,408 | 4/1979 | Koel et al. | 360/113 |
| 4,321,640 | 3/1982 | van Gestel | 360/113 |

FOREIGN PATENT DOCUMENTS 0877205  5/1953  Fed. Rep. of Germany ...... 360/121

Primary Examiner—Stuart N. Hecker
Assistant Examiner—Benjamin E. Urcia
Attorney, Agent, or Firm—David R. Treacy

[57] ABSTRACT

A magnetic head for reading analogue information on a track of a recording medium associated with the magnetic head. The head has a strip of magnetoresistive material serving as a reading element and arranged in a magnetic yoke at a given distance from the pole faces formed by the ends of the limbs of the magnetic yoke, the strip being connected in the magnetic circuit formed by the magnetic yoke. The magnetic yoke comprises three limbs separated by non-magnetic layers. The pole face of one of the outer limbs is located at a greater distance from the recording medium than the pole faces of the central limb and the other outer limb.

3 Claims, 5 Drawing Figures

MAGNETIC HEAD HAVING A THIN STRIP OF MAGNETORESISTIVE MATERIAL AS A READING ELEMENT

The invention relates to a magnetic head for reading analogue information on a track of a recording medium associated with the magnetic head, having a strip of magnetoresistive material which serves as a reading element, is arranged in a magnetic yoke at a given distance from the pole faces formed by the ends of the limbs of the magnetic yoke, and is connected in the magnetic circuit formed by the magnetic yoke.

A magnetic yoke which has two parallel limbs in which a non-magnetic gap is provided in one of the limbs and is bridged by a strip of magnetoresistive material is disclosed in U.S. Pat. Nos. 4,100,583 and 4,150,408, assigned to the assignee of the present application. The magnetic yoke whose free ends of its limbs during operation face the record carrier associated therewith, ensures the supply of magnetic flux to the strip of magnetoresistive material without it being necessary for said strip itself to contact the recording medium. As a result of the "open" flux supply possibility, the magnetic head is both sensitive to magnetic flux which is presented between the limbs of the yoke and associated with signals of shorter wavelengths, and to magnetic flux which is radiated from without direct into the yoke and is associated with signals of longer wavelengths. Hence the magnetic head has a wide-band reproduction characteristic. A disadvantage of the magnetic head having a two-limb yoke, however, proves to be that overdrive can easily occur, in particular in those applications in which reading has to be carried out with a comparatively large wavelength range, for example in audio applications. It should be borne in mind that upon writing audio information on a recording carrier by means of a conventional writing head the lower frequencies are amplified with respect to the higher ones. When such an audio recording is read by means of a magnetic head having a two-limb yoke in which a magnetoresistive material bridges a gap in one of the limbs, the reproduction characteristic proves to be far from flat. When the reproduction level at a given high frequency (for example 6000 Hz) is adjusted to 0 dB, it is found that as the frequency is reduced the output level first increases up to, in a certain case, 10 dB and then, from approximately 100 Hz downward, decreases. This necessitates a strong equalization of the output signal.

It is the object of the invention to provide a magnetic head of the kind described above having a construction which enables such an influencing of the characteristic of the reading element that a considerably smaller equalization of the output signal is necessary and in particular overdrive can be prevented.

According to the invention this object is achieved in a magnetic head of the kind described above by providing a magnetic yoke having three limbs separated by non-magnetic layers and, the pole face of one of the outer limbs being situated farther away from the recording medium than the pole faces of the central limb and the other limb, which are situated in a company plane.

The invention is based on the recognition of the fact that the cause of the difficulties which occur when the magnetic head having a two-limb yoke is used resides in that fact that magnetic flux originating from signals of longer wave lengths is radiated directly into the magnetic yoke and in particular directly into the magnetoresistive reading element itself. By constructing the magnetic yoke in which the magneto resistive reading element is connected so as to have three limbs, one of the outer limbs being slightly "shortened", magnetic flux originating from signals having longer wavelengths is radiated only for a part into the central limb and is dissipated for the other part via the "shortened" limb, while the magnetic flux originating from signals having shorter wavelengths is admitted undisturbedly as a result of the distance losses which occur at these shorter wavelengths between the recording medium and the pole face of the "shortened" limb. In this manner the characteristic of the magnetoresistive reading element can be influenced in the desired sense, which means that the characteristic is smoothed and overdrive is avoided.

The overall sensitivity can still be influenced by varying the spacing between the "shortened" limb and the central limb. Herewith a larger or a smaller shunt action is obtained.

The extent to which the outer limb in question is shortened is not very critical because the distance losses which at the shorter wavelengths play a role occur at small distances. In general, a shortening of less than 10 $\mu$m will produce a favourable effect.

Although the magnetoresistive reading element can be connected in the magnetic yoke in various manners, there is one construction which is very suitable from a point of view of manufacturing technology. In this construction a non-magnetic gap is provided in the central limb of the magnetic yoke at a certain distance from its pole face and is shunted by the strip of magnetoresistive material arranged so as to be electrically insulated with respect to the magnetic yoke.

It is to be noted that a magnetic head having a three-limb yoke in which a magnetoresistive reading element bridges a non-magnetic gap in the central limb is known from German Auslegeschrift No. 22 62 659 to which U.S. Pat. No. 3,921,217 corresponds. However, in this yoke the limbs are equally long so that their pole faces are situated in one plane. This construction is said to have the advantage that the two outer limbs of the yoke screen any magnetic action on the magnetoresistive element by information stored beyond the region between the said two outer limbs. As a result the magnetic head dislosed in the German Auslegeschrift is sensitive to information only which is always stored between the outer limbs of the yoke on the record carrier. The distance between said limbs is very small, since magnetic heads of the type described have a thin-film construction, so that only information which is represented by signals having shorter wavelengths is read. Such a head is suitable only for reading digital information, whereas the head of the present invention is suited for reading analogue information.

An embodiment of the invention will be described in greater detail with reference to the drawing.

FIG. 1 shows a thin-film magnetic head construction in which a first layer of NiFe (2) and a second layer of NiFe (3) forming the second and third limbs, respectively, of the magnetic yoke are deposited on an (NiZn or MnZn) ferrite substrate 1 which forms the first limb of a three-limb magnetic yoke.

Figure 1:
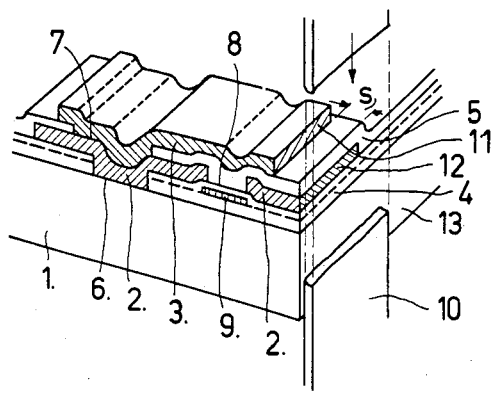
FIG. 1 shows partly as an elevation and partly as a cross-sectional view a first embodiment of a magnetic head according to the invention.

The ferrite substrate 1 and the NiFe layers 2 and 3 are separated from each other by non-magnetic layers 4 and 5 which, for example, may be formed from sputtered $SiO_2$. The NiFe layers 2 and 3 are connected together and to the ferrite substrate 1 via holes 6 and 7 which are provided in the layers 4 and 5, respectively.

A non-magnetic gap 8 which is filled with the material of the layer 5 is provided in the layer 2. The gap 8 is bridged by an approximately 100 nm thick strip 9 of magnetoresistive material which forms a reading element. The magnetic head construction thus formed is associated with a magnetic recording medium 10 which during operation is transported in the direction of the arrow.

Layer 3 which forms the "shortened" outer limb of the magnetic yoke has a pole face 11 which is situated at a distance from the recording medium 10 which is larger than the distance from the recording medium of the pole faces 12 and 13 of the limbs formed by the layer 2 and the substrate 1. In other words, pole face 11 is situated in a first plane and pole faces 12, 13 are situated in a second plane, the distance S between the first and the second plane being such that magnetic flux originating from signals having shorter wavelengths is not trapped by the layer 3 and magnetic flux originating from signals having longer wavelengths is trapped, as a result of which a given part of the magnetic flux originating from signals having longer wavelengths does not extend to the magneto-resistive reading element 9.

Figure 2:
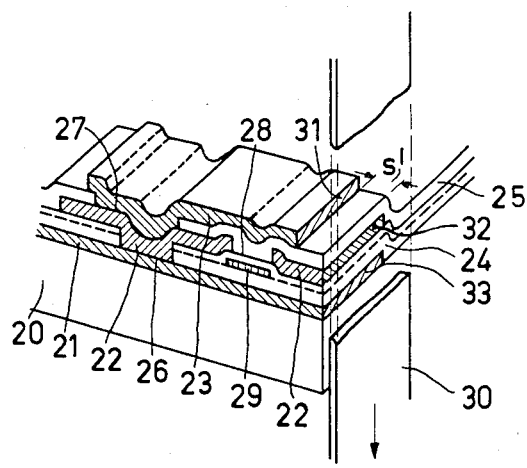
FIG. 2 shows partly as an elevation and partly as a cross-sectional view a second embodiment of a magnetic head according to the invention.

FIG. 2 shows a thin-film magnetic head construction in which first, second and third NiFe layers 21, 22, 23 are deposited on a non-magnetic substrate 20 and together form a three-limb magnetic yoke. The layers 21, 22, 23 are separated from each other by non-magnetic layers 24, 25 which may be formed, for example, from sputtered $SiO_2$. The NiFe layers 21, 22 and 23 are interconnected via holes 26 and 27 which are provided in the layers 24 and 25, respectively.

A non-magnetic gap 28 which is filled with the material of the layer 25 is provided in the layer 22. The gap 28 is bridged by an approximately 100 nm thick strip 29 of magnetoresistive material which forms a reading element. The magnetic head construction thus formed is associated with a magnetic recording medium 30 which during operation is transported in the direction of the arrow.

Layer 23 which forms the "shortened" outer limb of the magnetic yoke has a pole face 31 which is situated at a distance from the recording medium 30 which is larger than the distance from the recording medium 30 of the pole faces 32 and 33 of the limbs formed by the layers 22 and 23. In other words, pole face 31 is situated in a first plane and pole faces 32, 33 are situated in a second plane, the distance S' between the first and the second plane being proportioned in the same manner as the distance S in FIG. 1. Typical values for S and S' are between 0 and 10 μm.

A magnetic head having a construction as shown in FIGS. 1 and 2 is suitable, for example, for reading recording media 10, 30 on which information which represents audio signals in the frequency range from 20-20,000 Hz are provided.

Figure 3:
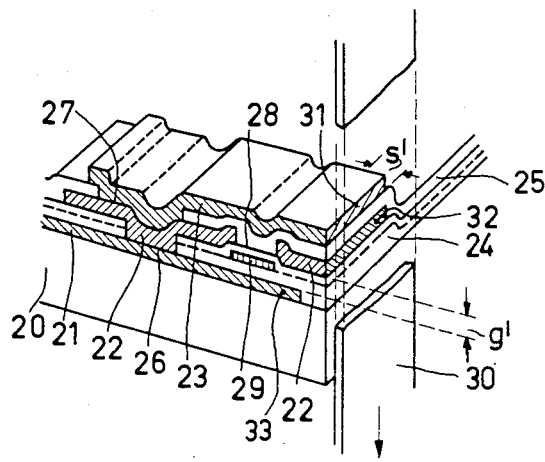
FIG. 3 shows partly as an elevation and partly as a cross-sectional view a third embodiment of a magnetic head according to the invention.

FIG. 3 shows a magnetic head construction which is a modified embodiment of the construction shown in FIG. 2.

The FIG. 2 construction is changed to such an extent that the pole face 31 of layer 23 is situated at the same height as the pole face 32 of layer 22, but that pole face 33 of layer 21 is situated at a retracted position with respect to the recording medium 30.

The effects of the magnetic head constructions shown in FIGS. 1, 2 and 3 will be explained with reference to FIGS. 4 and 5.

Figure 4:
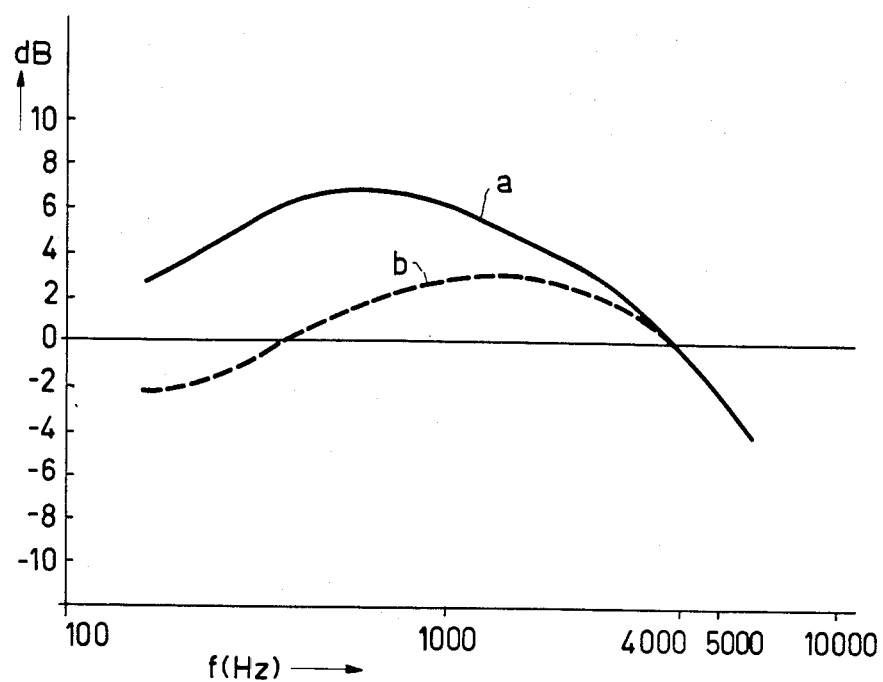
FIG. 4 shows the reproduction characteristic of a first magnetic head according to the invention.
Figure 5:
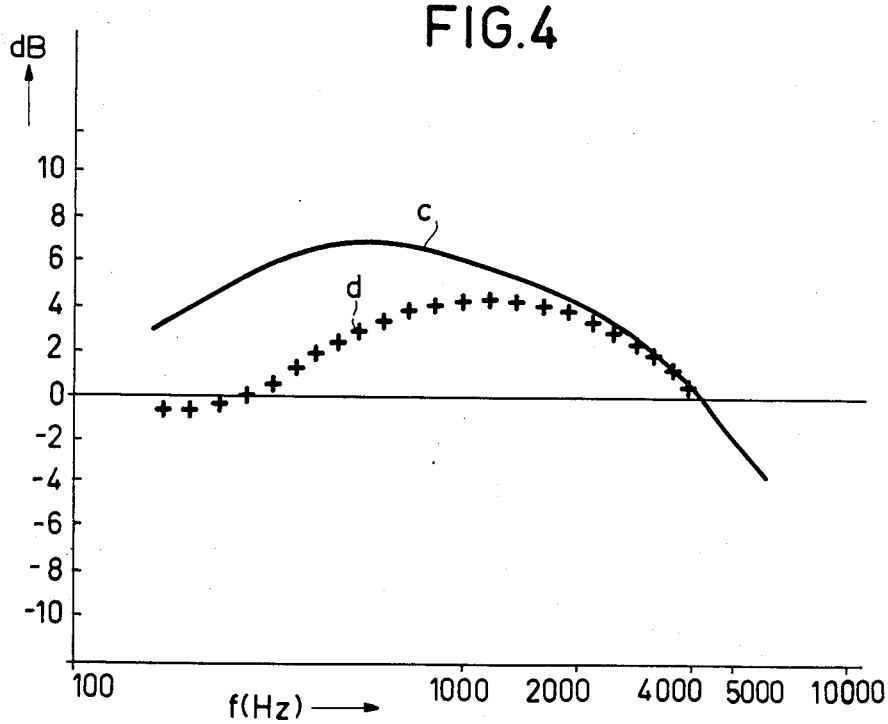
FIG. 5 shows the reproduction characteristic of a second magnetic head according to the invention, both compared with the reproduction characteristic of a conventional magnetic head.

The reproduction characteristic of a magnetic head of the FIG. 1 type is shown in FIG. 4 (curve b). As compared with the characteristic of a magnetic head of the FIG. 1 type in which the magnetic layer 3 (the "third" limb) is absent (curve a) a smoother variation is obtained which in the range of the lower frequencies does not give rise to overdrive as soon. The dimension S in that case was 5 μm. FIG. 5 shows the reproduction characteristic of another magnetic head of the FIG. 1 type (curve d). In this magnetic head the distance S was approximately 10 μm. In this case also the characteristic of the same magnetic head without the layer 3 (curve c) is shown in the Figure for comparison.

What is claimed is:

1. In a magnetoresistive head for reading analog information on a track of a recording medium wherein the head is comprised of a magnetic yoke having first and second outer arms and a central arm between said outer arms, the pole faces of the central and first outer arm being in a common plane, whereby the recording medium is adapted to be moved adjacent said yoke in a direction parallel to said common plane, and a strip of magnetoresistive material is coupled to said yoke at a position spaced from said plane, whereby said strip defines a reading element, the improvement wherein said second outer arm has a pole face spaced from said plane to define a gap between said plane and the pole face of said second outer arm, said arms being separated in part by non-magnetic layers, the pole face of said second outer arm being at a greater distance from said recording medium than the pole faces of said first outer and central arms, whereby magnetic flux arising from information on said recording medium at a first frequency is dissipated in said gap to a greater extent than magnetic flux arising from information on said recording medium at a second higher frequency to thereby reduce magnetic flux coupled to said strip at said first frequency.

2. The magnetoresistive head of claim 1 wherein a non-magnetic gap is provided in said central arm and spaced from said plane, said strip being positioned to shunt said non-magnetic gap, said shunt being electrically insulated from said yoke.

3. The magnetoresistive head of claim 2 wherein holes are provided in said non-magnetic layers, said arms of said yoke being interconnected via said holes.

* * * * *